US010402329B1

United States Patent
Vantrease

(10) Patent No.: US 10,402,329 B1
(45) Date of Patent: Sep. 3, 2019

(54) REDUCING TRAFFIC IN HIERARCHICAL CACHE INTERCONNECTS

(71) Applicant: Amazon Technologies, Inc., Seattle, WA (US)

(72) Inventor: Dana Michelle Vantrease, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,376

(22) Filed: Sep. 26, 2017

(51) Int. Cl.
  *G06F 12/00* (2006.01)
  *G06F 12/0831* (2016.01)
  *G06F 11/30* (2006.01)
  *G06F 12/0811* (2016.01)
  *G06F 9/46* (2006.01)
  *G06F 9/30* (2018.01)

(52) U.S. Cl.
  CPC ........ *G06F 12/0831* (2013.01); *G06F 9/3004* (2013.01); *G06F 9/466* (2013.01); *G06F 11/3037* (2013.01); *G06F 12/0811* (2013.01); *G06F 2212/1016* (2013.01)

(58) Field of Classification Search
  None
  See application file for complete search history.

(56) References Cited

U.S. PATENT DOCUMENTS

2013/0019064 A1* 1/2013 Kumashikar ......... G06F 12/126
  711/130
2014/0208141 A1* 7/2014 Bhandaru ............. G06F 1/3206
  713/322

* cited by examiner

*Primary Examiner* — Daniel D Tsui
(74) *Attorney, Agent, or Firm* — Kilpatrick Townsend & Stockton LLP

(57) ABSTRACT

A congestion controller may be configured to control traffic on an interconnect between a higher level cache and a lower level cache. The lower level cache may also be coupled to a main memory. The congestion controller may be configured to reduce congestion on the interconnect by blocking transactions that include writing of data to the lower level cache if the data has not been modified relative to a copy of the data in the main memory. The congestion controller may also be configured to control the traffic by blocking certain transactions in a controlled manner for traffic shaping or for performance features.

19 Claims, 12 Drawing Sheets

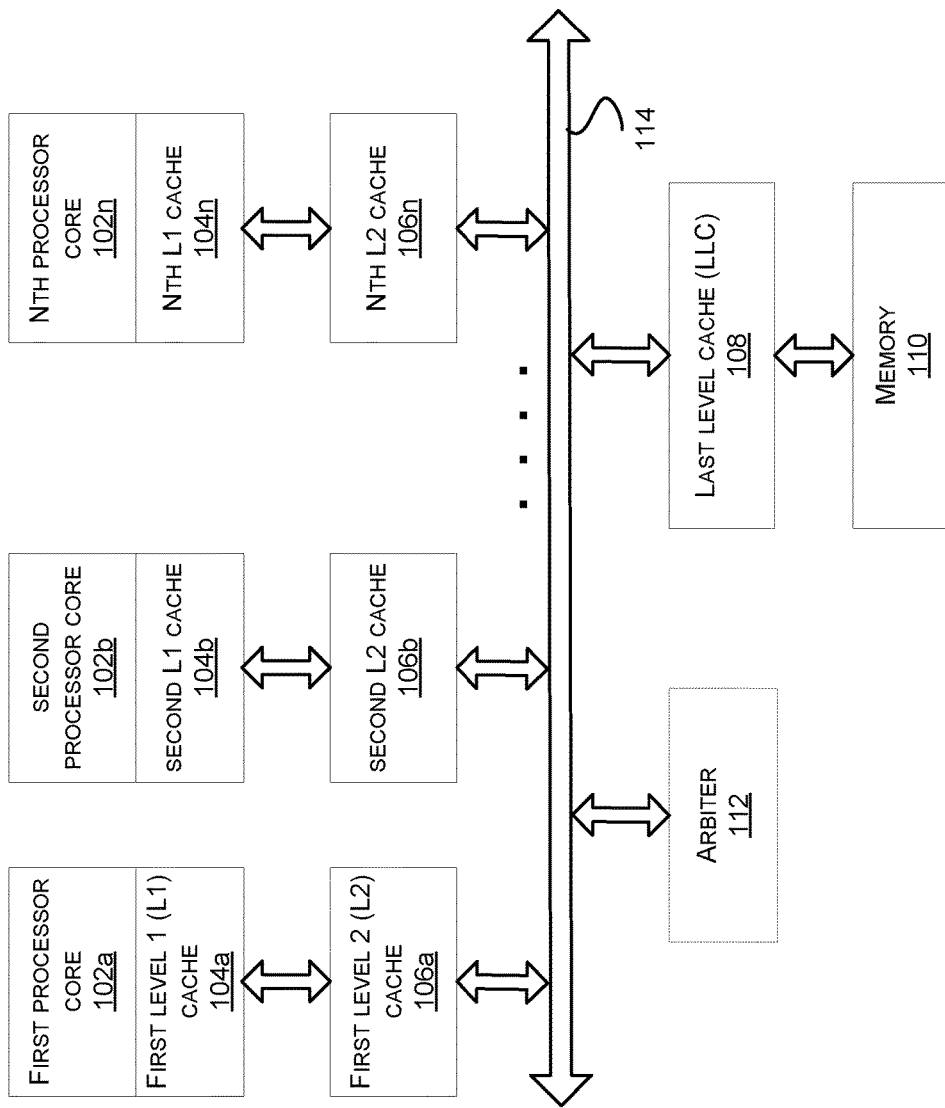

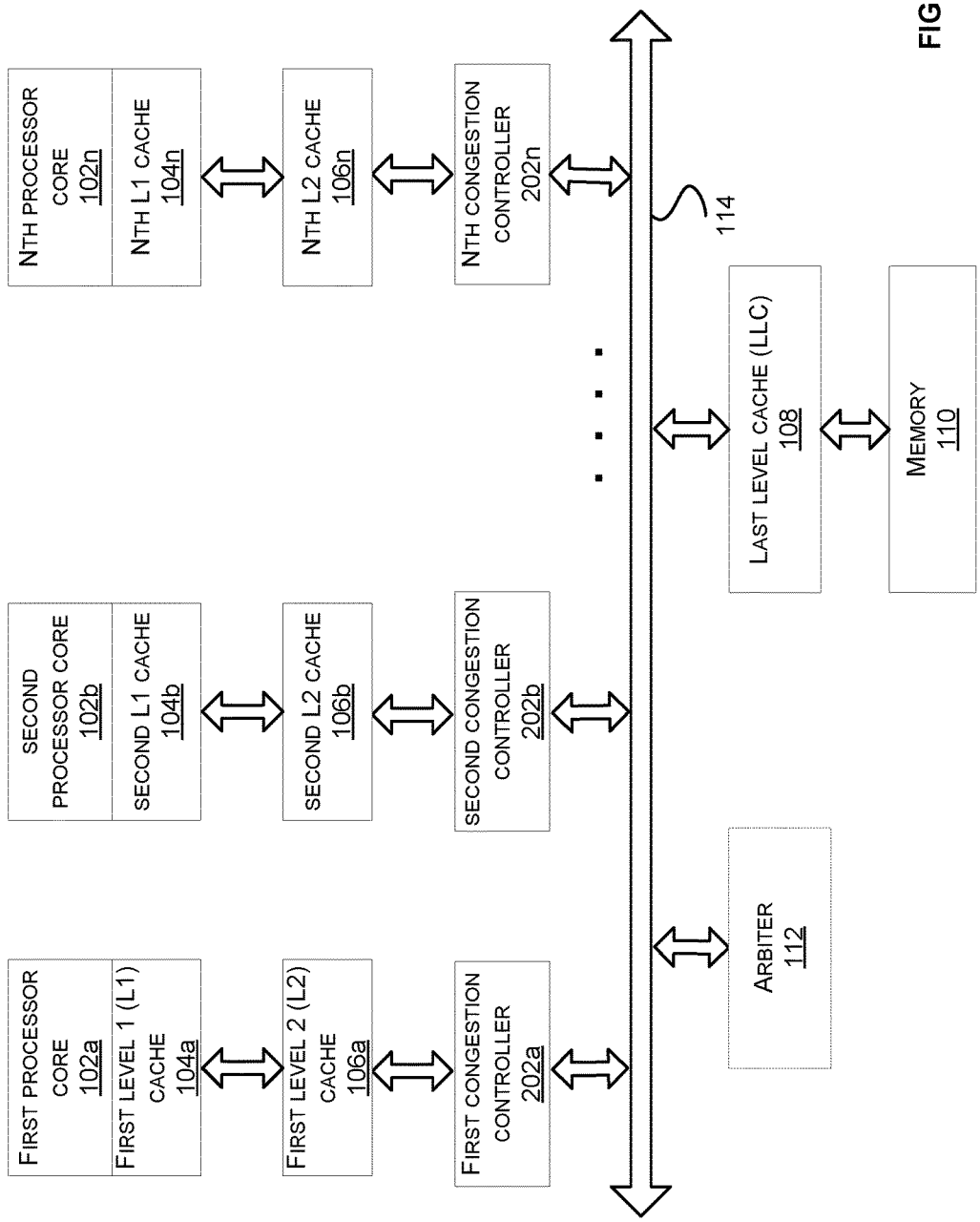

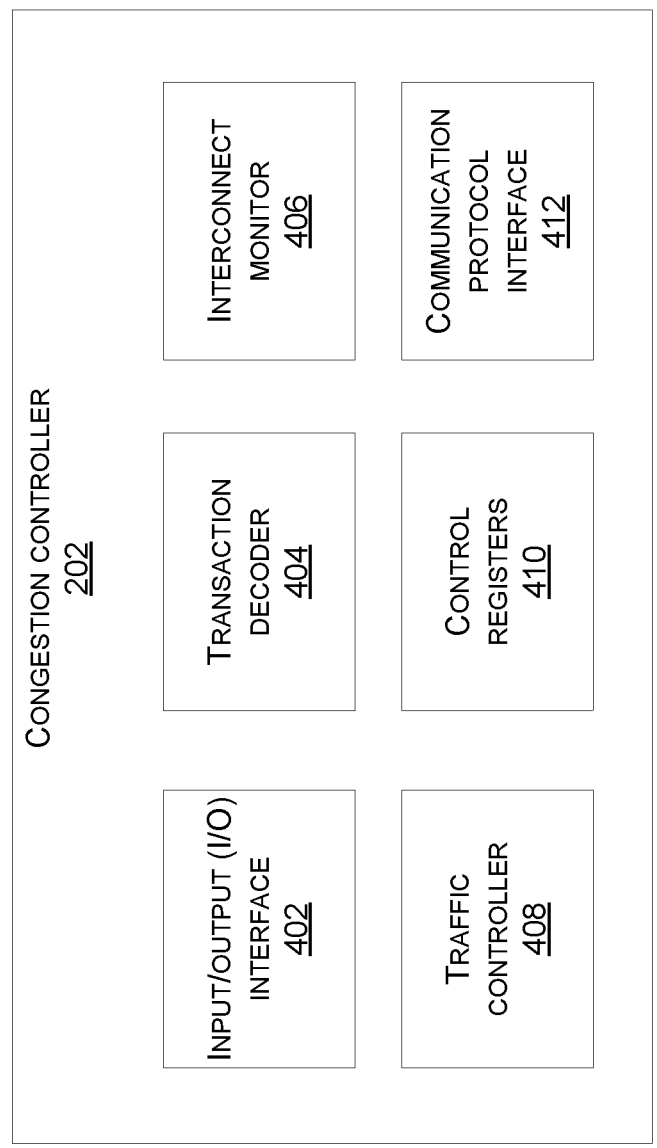

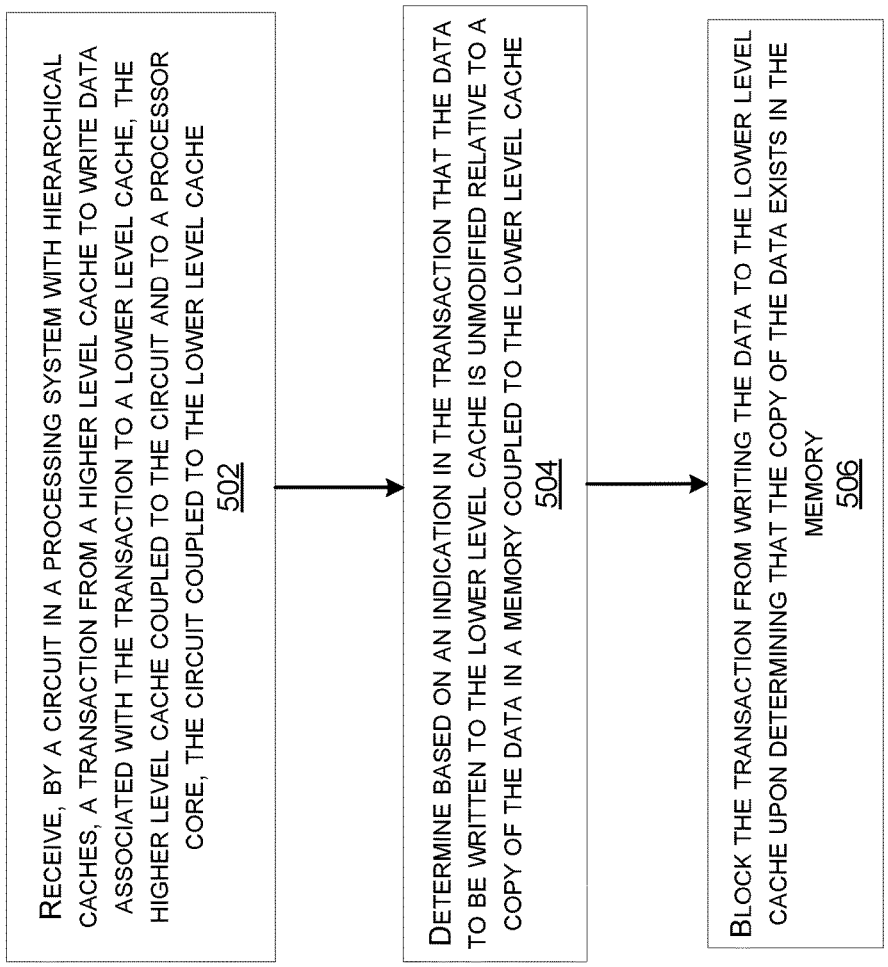

REDUCING TRAFFIC IN HIERARCHICAL CACHE INTERCONNECTS

BACKGROUND

Multi-core processing systems generally utilize hierarchical caches to improve system performance by minimizing accesses to a main memory. A cache coherence protocol may be used to maintain coherency of the data among the hierarchical caches and the main memory. In most instances, when clean data is evicted from a lower level cache to make room for new data, the lower level caches write back the clean data to a higher level cache for future use.

BRIEF DESCRIPTION OF THE DRAWINGS

Various embodiments in accordance with the present disclosure will be described with reference to the drawings, in which:

FIG. 1 shows a processing system comprising hierarchical caches;

FIG. 2B shows a processing system comprising congestion controllers coupled to an interconnect to control traffic on the interconnect, in some embodiments of the disclosed technologies;

FIG. 4 illustrates a block diagram for a congestion controller, in one embodiment;

FIG. 5 illustrates a method executed by a congestion controller to control traffic on an interconnect, in some embodiments;

DETAILED DESCRIPTION

Figure 2A:
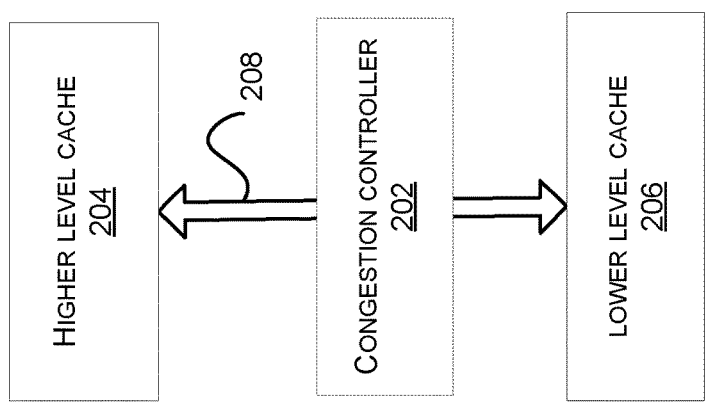
FIG. 2A shows an apparatus comprising a congestion controller, a higher level cache, and a lower level cache, in some embodiments of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Multi-core processing systems generally utilize hierarchical caches to improve system performance by minimizing accesses to a main memory. Hierarchical caches may include multiple levels of caches, e.g., a level one (L1) cache, a level two (L2) cache, and a level three (L3) cache. In most instances, each processor core of a multi-core processing system may have a dedicated L1 cache. Each L1 cache may be integrated with the respective processor core, or may be on-chip with the processor core. The L2 cache may be dedicated to a single processor core, or may be shared with two or more processor cores. The L3 cache may be shared among all the processor cores of the multi-core processor. In some implementations, separate caches may be used to store instructions and data for the processor cores. Generally, caches that are closer to the processor cores may also be called higher level caches as compared to lower level caches that are farther away from the processor cores. In some implementations, each of the higher level caches may communicate with the lower level caches via an interconnect. For example, the interconnect may include multiplexers, buses, matrix, switches, meshes, etc.

Generally, caches may be used to store copies of data from frequently used memory locations. When data is not found in the L1 cache (e.g., a cache miss), the next closest level of cache may be searched, e.g., the L2 cache. This process continues for all the levels of caches and finally the main memory may be searched if the data is not found in any of the caches. The lowest level of cache which is searched before accessing the main memory may also be called a last level cache (LLC). For example, the LLC may be the L3 cache or another lower level cache (e.g., a level four cache) based on the implementation. In most implementations, higher level caches that are closer to the processor cores are smaller in size and latency as compared to the lower level caches that are farther away from the processor cores.

In processing systems utilizing multiple levels of caches, at any instance, different copies of the same data may exist in different caches and the main memory. A cache coherency protocol, e.g., snooping or a coherency directory based, may be used to maintain data coherency among the hierarchical caches and the main memory. In some implementations, MESI protocol may be used to maintain cache coherency. For example, the MESI protocol can allow marking each cache line with one of the four states, e.g., modified (M), exclusive (E), shared (S) or invalid (I). A cache line may indicate a block of data, e.g., 16 bytes, 64 bytes, 256 bytes, or any other suitable size. In this specification, the terms "cache line" and "data" may be used interchangeably within the context of the caches. The modified state may indicate that the cache line is present only in the current cache, and is dirty. For example, the dirty cache line may indicate that the data for the cache line has been modified relative to a copy of the data in the main memory. The exclusive state may indicate that the cache line is present only in the current cache, and is clean. A clean cache line may indicate that the data for the cache line has not been modified relative to a copy of the data in the main memory. The shared state may indicate that the cache line may be present in other caches, and the cache line is clean. The invalid state may indicate that the cache line is invalid. For example, when a cache line is marked modified in one cache, copies of this cache line in other caches may be marked invalid.

The hierarchical caches may utilize a write through or a write back policy when the data is written to a cache. In write through caches, the data may be written to the main memory and to the caches synchronously. In write back caches, the data may only be written to the cache first. The cache may write the data to the main memory at a later point in time, e.g., when the data is to be modified or replaced. In some instances, when there is a cache miss in a higher level cache, one of the existing cache lines may be evicted from the higher level cache to make space for a new cache line. The cache line to be evicted may be selected based on a replacement policy. For example, in one implementation, a least recently used cache line may be selected for eviction. In some instances, the evicted cache line may be clean and may be in an exclusive state. For example, the cache line may be present only in the current cache. A clean write back may correspond to writing back a clean cache line to another cache or to the main memory. In some implementations, when a clean cache line is evicted from a higher level cache, the higher level cache may write back the clean cache line to the lower level cache for future use. However, the clean write backs may introduce additional traffic and can contribute to congestion on the interconnect between the higher level cache and the lower level cache. For example, in certain instances, when the interconnect is already busy, the clean write backs may further lower the system performance by taking up the bandwidth on the interconnect and exasperating the congestion on the interconnect.

Some embodiments of the disclosed technologies may provide a minimally invasive method to dynamically block certain transactions from a higher level cache to write data to a lower level cache if the data is unmodified relative to a copy of the data in the main memory. For example, the transaction may include writing back clean data on eviction from the higher level cache to the lower level cache in a system with hierarchical caches. Generally, the clean write backs are a performance feature to keep the data on-chip in case of future use. However, the clean write backs are not necessary for functional correctness because a copy of the clean data may already exist in the main memory. In some embodiments, write backs of the clean data by a higher level cache to a lower level cache may be eliminated. In some implementations, the lowest level cache may also be called the last level cache (LLC). Elimination of these write backs of the clean data may help minimize the congestion on the interconnect between the higher level cache and the lower level cache without affecting the functional correctness of the system.

Embodiments of the disclosed technology may provide a mechanism in hardware or software to control the traffic on the interconnect. In one embodiment, the traffic may be monitored and controlled using a congestion controller coupled to the interconnect. In another embodiment, the congestion controller may be part of the higher level cache or the lower level cache. The congestion controller may activate the mechanism dynamically to control the traffic on the interconnect when the congestion is detected. The congestion on the interconnect may be detected if a request to access the interconnect repeatedly loses arbitration for access rights to the interconnect. The arbitration may be provided using a dedicated arbiter or a distributed arbiter. A dedicated arbiter may be coupled to the interconnect which may grant access rights to the interconnect using any suitable arbitration algorithm. In a distributed arbitration protocol, each agent coupled to the interconnect may be aware of the arbitration rules and may abide by the arbitration rules. For example, an agent may test if the interconnect is busy, and may try to access the interconnect again in a determinate amount of time. Although, interconnect congestion is described and discussed herein, congestion or inability of the LLC to respond to requests may also be considered as congestion and reducing the number of transactions directed towards the LLC may alleviate the LLC's inability to keep up with the transactions directed towards the LLC. Therefore, in some embodiments, congestion may be detected based on detecting that the LLC is busy based on receiving retry messages from the LLC.

In some embodiments, the congestion controller may intercept the transaction requests sent by a higher level cache and identify that the transaction includes writing back clean data to a lower level cache based on certain information associated with the transaction. The congestion controller may control the traffic by blocking the transactions that include write backs of the clean data to the lower level cache. Blocking a transaction that includes write back of the clean data to the lower level cache may refer to dropping, eliminating, or deleting the transaction before the transaction is deployed on the interconnect. The congestion controller may also proxy for the lower level cache to send a response for the transaction. For example, based on the interconnect protocol, the congestion controller may send an acknowledgement to the higher level cache on behalf of the lower level cache, as a proxy for the lower level cache, to indicate to the higher level cache that the transaction has been received by the lower level cache, even though the transaction was never deployed to the lower level cache on the interconnect.

Some embodiments may be used to help with traffic shaping or to improve performance by blocking the transactions that include write backs of the clean data in a controlled manner. For example, in some implementations, certain bandwidth may be allocated to each processor core or agent on the interconnect. In some instances, if a processor core, or agent is approaching its bandwidth limit, the congestion controller may start blocking certain transactions from that processor core, or agent that include write backs of the clean data to the lower level cache. In some embodiments, based on a service level agreement (SLA) with a customer, one or more processor cores may be configured so that the transactions with write backs of the clean data to the lower level cache are always blocked once the given processor core reaches its bandwidth limit. Similarly, in some embodiments, one or more processor cores may also be configured so that write backs of the clean data to the lower level cache are always blocked once the given processor core reaches its Quality of Service (QoS) limit. For example, the QoS limit may be used to allow fairness in terms of access to certain resources in the system.

In some embodiments, transactions that include accesses to certain address ranges can be blocked to enhance the performance. For example, if a cache line is not frequently used or is not needed for some reason, either based on heuristics or a type of traffic load (e.g., Voice over IP, video streaming, etc.), writing back of that cache line to the lower level cache can be eliminated to make room for another cache line. Eliminating the clean write backs selectively may improve traffic on the interconnect without affecting the functional performance.

As compared to systems that provide an internal mechanism within a cache or a processor core to eliminate the clean write backs, some embodiments can provide a mechanism external to the caches to dynamically control the traffic. Having an external circuit coupled to the interconnect can provide a minimally invasive method to improve the performance of the system during bursty periods of congestion without affecting the functional performance of the system. Thus, some embodiments can provide a mechanism to control the traffic on the interconnect with minimal changes to the existing hardware, e.g., without modifying the caches or processor cores of a multi-core processing system. However, it will be understood that some embodiments can allow the congestion control mechanism to be part of the cache or the processor core, without deviating from the scope of the disclosed technologies.

FIG. 1 shows a processing system 100 comprising hierarchical caches. For example, the processing system 100 may be part of a computer. Note that one or more caches in the hierarchical caches may be used to store instructions or data. However, for the purposes of simplicity, only the term data may be used in this specification.

The processing system 100 may include multiple processor cores, hierarchical caches, a memory 110 and an arbiter 112. The processing system 100 may include fewer or different components as well, which are not shown here for the purposes of simplicity. The multiple processor cores may include a first processor core 102a, a second processor core 102b and an $N^{th}$ processor core 102n. The hierarchical caches may include multiple first level (L1) or primary caches, multiple second level (L2) or secondary caches, and a last level cache (LLC).

Each level in the cache hierarchy may have a larger capacity than the level above it in the cache hierarchy. A higher level cache may represent the cache closer to the processor core which may provide a faster access time relative to other caches that may be farther away from the process core. For example, the L1 caches may be higher in level relative to the L2 caches, and the L2 caches may be higher in level relative to the L3 caches. In some implementations, the L1 caches may store more frequently used data as compared to the L2 caches. The L2 caches may store more frequently used data as compared to the LLC. The LLC may include a level 3 (L3) cache or another lower level cache (e.g., level four cache) based on the implementation.

The multiple L1 caches may include a first L1 cache 104a, a second L1 cache 104b and an $N^{th}$ L1 cache 104n. Each of the multiple L1 caches 104a-104n may be associated with a respective processor core. In some implementations, separate L1 instruction and data caches may be associated with each processor core. However, for the purposes of simplicity, a single L1 cache is shown in FIG. 1. Thus, each L1 cache may be a dedicated cache for a respective processor core and may not be shared with another processor core. For example, the first L1 cache 104a may be a dedicated cache for the first processor core 102a, the second L1 cache 104b may be a dedicated cache for the second processor core 102b, and the $N^{th}$ L1 cache 104n may be a dedicated cache for the $N^{th}$ processor core 102n. Each of the multiple L1 caches 104a-104n may be integrated with, or on-chip with the respective processor core to minimize the access time by the processor core. Each of the first L1 cache 104a, second L1 cache 104b, and the N" L1 cache 104n may include a smaller and faster memory, e.g., a static random access memory (SRAM), which may be 32 KB, 64 KB, or any suitable size based on the implementation.

The multiple L2 caches may include a first L2 cache 106a, a second L2 cache 106b, and an $N^{th}$ L2 cache 106n. Each L2 cache may be larger in size than the L1 cache to provide more storage space. For example, each of the first L2 cache 106a, the second L2 cache 106b and the $N^{th}$ L2 cache 106n may include a faster SRAM which may be 256 KB, 512 KB or any suitable size. Each L2 cache may be coupled to the respective L1 cache via a respective interconnect. For example, the interconnect may include multiplexers, meshes, matrix or buses. In some implementations, each L2 cache may also be on-chip with the respective processor core to minimize the access time by the processor core. Each of the L2 caches 106a-106n may communicate with the respective processor core using a backside bus or another suitable internal bus. In some implementations, each of the L2 caches 106a-106n with their associated logic (e.g., one or more processor cores) may act as an agent on the interconnect 114.

The LLC 108 may be shared by all the processor cores 102a-102n. The LLC 108 may include a slower memory as compared to each of the L1 cache or the L2 cache, but faster than the memory 110. The LLC 108 may include an SRAM or any suitable memory. If a processor core does not find certain data in their respective L1 cache or the L2 cache, the LLC 108 may be searched before accessing the memory 110. In some implementations, shared instructions used by some or all the processor cores 102a-102n may be stored in the LLC 108 along with other data. The LLC 108 may be a level three (L3) cache or a lower level cache (e.g., level four cache). The LLC 108 may be 8 MB, 16 MB, or any suitable size.

The memory 110 may be coupled to the LLC 108. The memory 110 may be slower but bigger in size as compared to the L1 cache, L2 cache and the LLC cache. For example, the memory 110 may include a dynamic random access memory (DRAM), an synchronous DRAM (SDRAM), a double data rate (DDR) SDRAM, etc. In some implementations, the memory 110 may be part of a main memory for the processing system 100.

The L2 caches 106a-106n may be coupled to the LLC 108 via an interconnect 114. The interconnect 114 may include any suitable implementation, e.g., multiplexers, buses, matrix, switches, meshes, fabrics, etc. Each of the L2 caches 106a-106n and the LLC 108 may communicate with one another via the interconnect 114 using any suitable communication protocol. For example, the communication protocol may be based on a handshake protocol.

In some implementations, an optional arbiter 112 may be coupled to the interconnect 114 to provide arbitration for transaction requests to access the interconnect 114, e.g., by the L2 caches 106a-106n, or by the LLC 108. The arbiter 112 may be configured to perform arbitration based on any suitable algorithm, e.g., round robin, priority based, random, etc. The arbiter 112 may provide an arbitration result based on the algorithm and grant access to the interconnect 114 to the requester that wins the arbitration.

In some implementations, a higher level cache which is in an exclusive state may write back a clean cache line to the lower level cache on eviction. For example, when a clean cache line is evicted from any of the L2 caches 106a-106n, the given L2 cache may write back the clean cache line to the LLC 108 in case of future use. Since a copy of the clean cache line may already exist in the memory 110, writing back of the clean cache line to the LLC 108 may not be necessary for functional correctness. In instances when the interconnect 114 is congested, these clean write backs may contribute to additional traffic on the interconnect 114, thus lowering the system performance.

Embodiments of the disclosed technologies can provide a method to dynamically block certain transactions from a higher level cache to write data to a lower level cache if the data is unmodified relative to a copy of the data in the main memory. In some embodiments, a congestion controller may be used to control traffic on an interconnect between the higher level cache and the lower level cache by selectively blocking certain transactions. The congestion controller may be coupled to the interconnect and may block the transaction from the higher level cache to write the data to the lower level cache before the transaction is deployed to the lower level cache on the interconnect. In various embodiments, the congestion controller may be used to control traffic on an interconnect between an L1 cache and an L2 cache, between an L2 cache and an L3 cache, or between an L3 cache and an L4 cache based on the implementation. This is further explained with reference to FIGS. 2A, 2B, 2C, and 2D.

FIG. 2A shows an apparatus 200 comprising a congestion controller 202, a higher level cache 204, and a lower level cache 206, in some embodiments. The congestion controller 202 may be coupled to an interconnect 208 between the higher level cache 204 and the lower level cache 206, or may be part of the higher level cache 204 or the lower level cache 206. For example, referring back to FIG. 1, in one embodiment, the higher level cache 204 may be one of the L1 caches 104a-104n and the lower level cache 206 may be a respective L2 cache from the L2 caches 106a-106n. The interconnect 208 may represent a respective interconnect between a given L1 cache and the L2 cache. In another embodiment, the higher level cache 204 may be one of the L2 caches 106a-106n, the lower level cache 206 may be the LLC 108, and the interconnect 208 may be similar to the interconnect 114. The interconnect 208 may include multiplexers, buses, matrix, switches, meshes or any suitable implementation. The higher level cache 204 may be coupled to a processor core and the lower level cache 206 may be coupled to a memory.

The congestion controller 202 may receive a transaction from the higher level cache 204 to write data for the transaction to the lower level cache 206. The congestion controller 202 may be configured to block the transaction if the data for the transaction is unmodified relative to a copy of the data in the main memory. For example, blocking the transaction may also be interpreted as dropping or eliminating the transaction so that the transaction is not deployed to the lower level cache 206 on the interconnect 208. The congestion controller 202 may determine if the data for the transaction has been modified or not based on certain information associated with the transaction. The congestion controller 202 may be further configured to block the transaction for a clean write back to the lower level cache 206 under different scenarios, which are discussed below with reference to FIGS. 2B, 2C, and 2D.

FIG. 2B shows a processing system 210 comprising congestion controllers coupled to an interconnect to control traffic on the interconnect, in some embodiments of the disclosed technologies. The multiple congestion controllers may include a first congestion controller 202a, a second congestion controller 202b, and an $N^{th}$ congestion controller 202n. The processing system 210 may also include one or more components of the processing system 100 of FIG. 1, e.g., the L1 caches 104a-104n, the L2 caches 106a-106n, LLC 108, the processor cores 102a-102n, arbiter 112, and the memory 110, in addition to the congestion controllers 202a-202n. In some implementations, the processing system 210 may be part of a computer.

In some embodiments, the processing system 210 may include a dedicated congestion controller for each L2 cache. For example, the first congestion controller 202a may be coupled to the first L2 cache 106a, the second congestion controller 202b may be coupled to the second L2 cache 106b, and the $N^{th}$ congestion controller 202n may be coupled to the $N^{th}$ L2 cache 106n. Each of the congestion controllers 202a-202n may be coupled to the LLC 108 via the interconnect 114. Referring back to FIG. 2A, each of the L2 caches 106a-106n may be similar to the higher level cache 204 and the LLC 108 may be similar to the lower level cache 206.

The processing system 210 may utilize a dedicated arbiter (e.g., the arbiter 112) or a distributed arbiter. In one embodiment, the arbiter 112 may be used to perform arbitration to grant access rights to the interconnect 114 to any of the congestion controllers 202a-202n as well as the LLC 108. In another embodiment, in place of the arbiter 112, a distributed arbitration protocol may be used by all the agents coupled to the interconnect 114 to grant access rights to the interconnect 114. For example, the agents may include the congestion controllers 202a-202n and the LLC 108. Each of the congestion controllers 202a-202n and the LLC 108 may be aware of the arbitration rules and may abide by the arbitration rules. For example, if a congestion controller or the LLC 108 wants to access the interconnect 114, it may test if the interconnect 114 is busy and may try to access the interconnect 114 again in a determinate amount of time.

Each of the congestion controllers 202a-202n may be configured to control the traffic on the interconnect 114 under different scenarios. In one embodiment, each of the congestion controllers 202a-202n may be configured to monitor the interconnect 114 to detect congestion on the interconnect 114. Each of the congestion controllers 202a-202n may utilize a suitable criteria to detect congestion on the interconnect 114. For example, in one instance, when a request to access the interconnect 114 repeatedly loses arbitration for access rights to the interconnect 114, it may be an indication that there is congestion on the interconnect 114. In another instance, congestion or inability of the LLC 108 to respond to the requests may also be considered as congestion. For example, the LLC 108 may be receiving too many requests on the interconnect 114 and may be busy, and thus cannot handle additional requests for some time. Therefore, in some embodiments, congestion on the interconnect 114 may be detected based on detecting that the LLC 108 is busy based on receiving retry messages from the LLC 108. The request to access the LLC 108 may be initiated by one of the L2 caches 106a-106n, and the retry message may be visible to all the L2 caches 106a-106n via the interconnect 114.

Each of the congestion controllers 202a-202n may be further configured to activate a respective mechanism to reduce the congestion on the interconnect 114 when the congestion is detected on the interconnect 114. The activation of the mechanism may be hardware or software based. For example, in one implementation, activating the mechanism may include setting a congestion flag (e.g., a bit) in a control register which may be implemented in hardware or software. The mechanism may be activated or deactivated dynamically during run time. For example, the congestion flag can be reset by the given congestion controller when less or no congestion is detected on the interconnect 114. In some embodiments, setting or resetting of the congestion flag by one congestion controller may be visible to the other congestion controllers coupled to the interconnect 114 using a software or hardware based mechanism. For example, setting or resetting a congestion flag by any of the congestion controllers 202a-202n may send a trigger to the processor cores 102a-102n, or activate a line that may be visible to all the congestion controllers 202a-202n.

When the congestion flag is set, the congestion controllers 202a-202n may reduce the congestion on the interconnect 114 by blocking the transactions that include write backs of the clean data to the LLC 108. In one instance, one or more of the congestion controllers 202a-202n may receive a transaction from the respective L2 cache to write data associated with the transaction to the LLC 108 via the interconnect 114. For example, the data may be associated with a cache line evicted from the respective L2 cache. The given congestion controller may be configured to determine whether the data to be written to the LLC 108 is clean or dirty data based on an indication in the transaction. For example, the given congestion controller may determine whether the data has been modified relative to a copy of the data for the transaction that exists in the memory 110. In some embodiments, the indication may be value of a command code included in the transaction. For example, a transaction to write the data to the LLC 108 may include information associated with the transaction as discussed with reference to FIG. 3A and FIG. 3B.

Figure 3A:
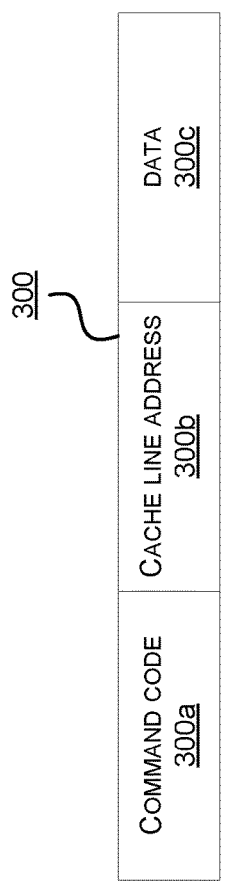
FIG. 3A illustrates information associated with a transaction to write data to a last level cache (LLC), in one embodiment.

FIG. 3A illustrates information associated with a transaction 300 to write data to the LLC 108, in one embodiment.

In one implementation, the transaction 300 may include a command code 300a, a cache line address 300b, and data 300c. The command code 300a may be used to indicate whether the data 300c associated with the transaction 300 has been modified or not relative to a copy of the data that exists in the memory 110. The cache line address 300b may indicate the address of the LLC 108 where the data 300c may be written. In some implementations, the cache line address 300b may include a tag, an index, and an offset to specify a location of the cache line for writing the data 300c. For example, the tag may include a portion of the address bits associated with the copy of the data 300c in the memory 110. The index may correspond to the cache row or the cache line, and the offset may correspond to the location of the data within the cache line. The tag or the index may correspond to a physical or a virtual address. The command code 300a is further explained with reference to a table 302.

Figure 3B:
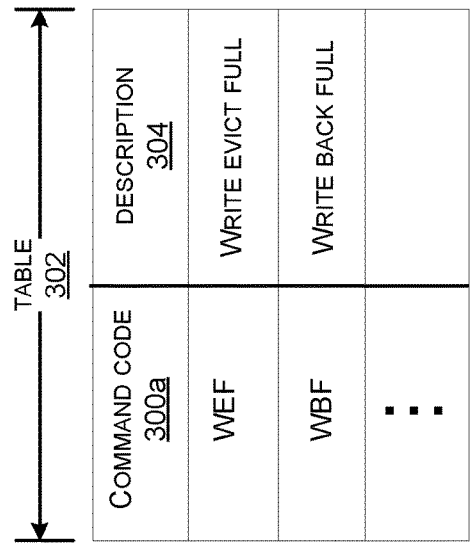
FIG. 3B illustrates a table to show examples of a command code, in one embodiment.

FIG. 3B illustrates the table 302 to show examples of the command code 300a, in one embodiment. A description field 304 describes the command corresponding to the command code 300a.

As illustrated in the table 302, a value "WEF" for the command code 300a may correspond to "write evict full" as shown by the description field 304. For example, the "write evict full" may indicate that the cache line has been evicted from the given L2 cache and has not been modified relative to a copy of the data in the memory 110. In some implementations, the "write evict full" may correspond to a valid or a clean status bit. Referring back to the table 302, a value "WBF" for the command code 300a may correspond to "write back full" as shown by the description field 304. For example, the "write back full" may indicate that the cache line has been modified relative to a copy of the data in the memory 110, and the modified copy needs to be written back to the memory 110. In some implementations, the "write back full" may correspond to a dirty status bit.

Referring back to FIG. 2B, based on the value of the command code 300a in the transaction, a given congestion controller may determine whether the data to be written for the transaction has been modified or not relative to a copy of the data in the memory 110. According to the embodiments, each of the congestion controllers 202a-202n may be configured to block the transaction from writing the data to the LLC 108 to reduce the congestion on the interconnect 114 if the data to be written has not been modified. For example, blocking the transaction may also be interpreted as dropping or eliminating the transaction so that the transaction is not deployed to the LLC 108 on the interconnect 114. Thus, in some embodiments, reducing a number of transactions directed towards the LLC 108 may alleviate the LLC 108's inability to keep up with the transactions directed towards the LLC 108.

Once the mechanism to reduce the congestion has been activated, e.g., the congestion flag is set in the control register, the given congestion controller may utilize the same criteria as for detecting the congestion to determine if the congestion has reduced at a later point in time. For example, if the access rights to the interconnect 114 can be won easily for a while, or the LLC 108 does not send any retry messages for a while, it may be an indication that the congestion has reduced. In some implementations, the congestion controller may deactivate the mechanism after blocking a certain number of transactions, after a predetermined period of time, or using other criteria. For example, the number of transactions and the predetermined period of time may be programmed in a control register. Once the congestion controller determines that the congestion has reduced based on the given criteria, the congestion controller may deactivate the mechanism by resetting the congestion flag in the appropriate control register.

In some embodiments, each of the congestion controllers 202a-202n may be configured to control the traffic on the interconnect 114 for traffic shaping. In some implementations, each of the processor cores 102a-102n may have been allocated a certain bandwidth or QoS limits. The QoS limit may be used to allow fairness in terms of access to certain resources in the system. For example, each processor core 102a-102n may support certain bandwidth or QoS limits to provide certain performance. Exceeding the bandwidth or the limit for the QoS may affect the performance of the processor core (e.g., less number of instructions executed within a specific time period). In some embodiments, if any of the processor cores 102a-102n exceeds its allocated bandwidth or QoS limit, a traffic shaping flag may be set in the respective control register to activate the mechanism to control the traffic on the interconnect 114. The traffic shaping flag may be set using a software or a hardware based mechanism. In some embodiments, when the traffic shaping flag is set, the congestion controllers 202a-202n may control the traffic on the interconnect 114 by blocking transactions for writing the data to the LLC 108 if the data for the transactions has not been modified relative to a copy of the data in the memory 110. As discussed earlier, the command code in the transaction may be used to determine if the data has been modified or not.

In some embodiments, the congestion controllers 202a-202n may be configured to block a transaction for writing data to the LLC 108 if an address associated with the transaction falls within a preconfigured address range. For example, the data for the transaction may be associated with a clean cache line that is a least frequently used cache line in an L cache. Such cache lines may occupy the cache memory space which can otherwise be used for another cache line needed on-chip more frequently. Thus, the least frequently used cache line may be dropped to make room for a new cache line for performance reasons. In some embodiments, filters for the address ranges which need to be blocked may be programmed in a register or in the memory 110.

Thus, in different embodiments, traffic on the interconnect 114 may be controlled by activating a mechanism under different scenarios, e.g., setting a congestion flag if congestion on the interconnect is detected, setting a traffic shaping flag to perform traffic shaping, or by blocking certain address ranges using preconfigured address filters to improve system performance. In some embodiments, a single congestion controller may be used to control traffic on the interconnect 114, as discussed with reference to FIG. 2C.

Figure 2C:
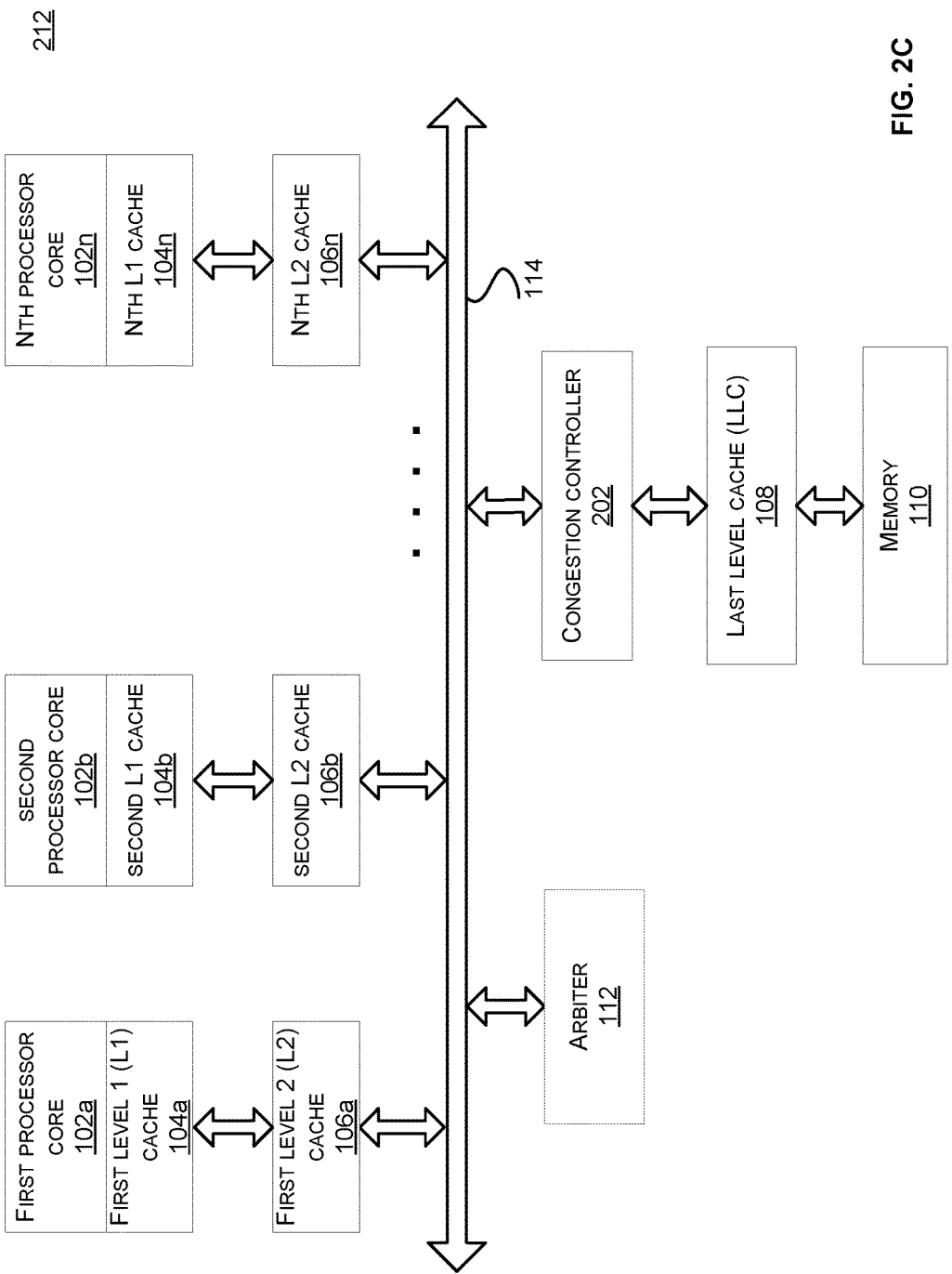
FIG. 2C shows a processing system comprising a congestion controller coupled to level 2 (L2) caches via an interconnect, and to a last level cache (LLC), in some embodiments of the disclosed technologies.

FIG. 2C shows a processing system 212 comprising the congestion controller 202 coupled to the L2 caches 106a-106n via the interconnect 114, and to the LLC 108, in some embodiments of the disclosed technologies. In some implementations, the processing system 212 may be part of a computer.

The congestion controller 202 may be configured to block certain transactions received from any of the L2 caches 106a-106n that include writing the data for the transaction to the LLC 108 if a copy of the data exists in the memory 110. For example, referring back to FIG. 2A, any of the L2 caches 106a-106n may be similar to the higher level cache 204 and the LLC 108 may be similar to the lower level cache 206. The congestion controller 202 may be further configured to block certain transactions under different scenarios as discussed with reference to the congestion controllers 202a-202n in FIG. 2B.

Figure 2D:
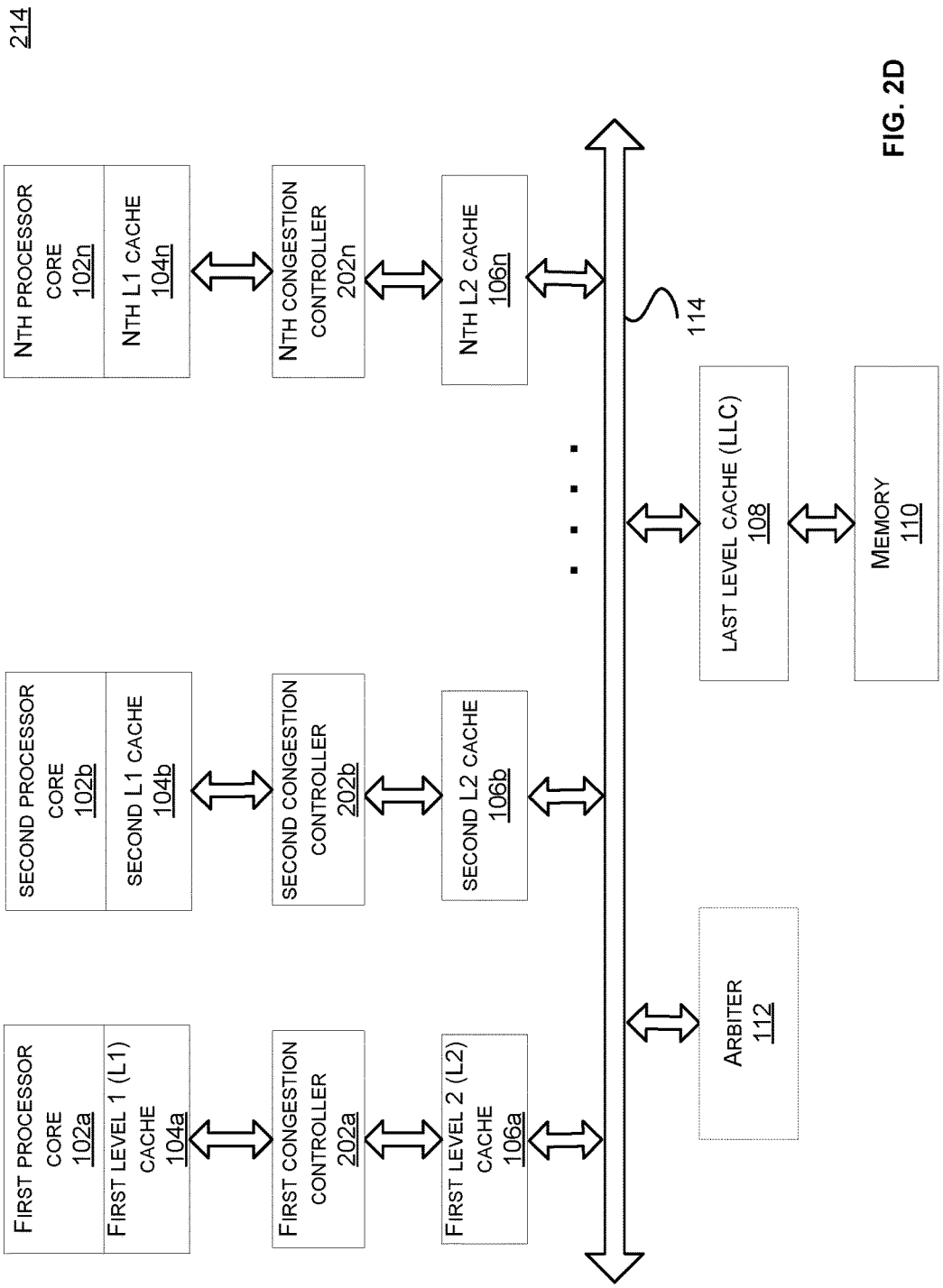
FIG. 2D shows a processing system comprising congestion controllers configured to control traffic between the level 1 (L1) caches and the L2 caches, in some embodiments of the disclosed technologies.

FIG. 2D shows a processing system 214 comprising congestion controllers configured to control traffic between the L1 caches and the L2 caches, in some embodiments of the disclosed technologies. The processing system 214 may include one or more components of the processing system 210 of FIG. 2A, e.g., the L1 caches 104a-104n, the L2 caches 106a-106n, LLC 108, the processor cores 102a-102n, arbiter 112, and the memory 110, in addition to the congestion controllers 202a-202n. In some implementations, the processing system 214 may be part of a computer.

As illustrated in FIG. 2D, each of the congestion controllers 202a-202n may be coupled to a respective L1 cache from the L1 caches 104a-104n and to a respective L2 cache from the L2 caches 106a-106n to control traffic on an interconnect between the respective L1 cache and the L2 cache. In some implementations, separate congestion controllers may be used for instruction and data L1 caches to eliminate clean write backs of instruction and data cache lines. Each L1 cache from the L1 caches 104a-104n may be similar to the higher level cache 204 shown in FIG. 2A, and each L2 cache from the L2 caches 106a-106n may be similar to the lower level cache 206 shown in FIG. 2A. Each of the congestion controllers 202a-202n may be configured to block certain transactions received from the respective L1 cache to write data for the transaction in the respective L2 cache if a copy of the data exists in the memory 110. The congestion controllers 202a-202n may be configured to block certain transactions under different scenarios as discussed with reference to FIG. 2B. Each of the congestion controllers may be integrated with the respective L1 cache, L2 cache, or a combination thereof based on the implementation.

FIG. 4 illustrates a block diagram 400 for the congestion controller 202, in one embodiment. The congestion controller 202 may be used in place of each of the first congestion controller 202a, second congestion controller 202b, or the $N^{th}$ congestion controller 202n to control the traffic on an interconnect between a higher level cache and a lower level cache in a processing system.

The congestion controller 202 may include hardware or software components. For example, the congestion controller 202 may be implemented as an integrated circuit, a field programmable gate array (FPGA), or any suitable circuit. In one implementation, the congestion controller 202 may include an input/output (I/O) interface 402, a transaction decoder 404, an interconnect monitor 406, a traffic controller 408, control registers 410, and a communication protocol interface 412.

In one embodiment, the I/O interface 402 may be configured to interface with the interconnect 114, higher level caches, and the lower level caches. For example, in one embodiment, the I/O interface 402 may be used to connect with the given L2 cache in addition to the interconnect 114, as discussed with reference to FIG. 2B. In another embodiment, the I/O interface 402 may be used to connect to the interconnect 114 and to the LLC 108, as discussed with reference to FIG. 2C. In another embodiment, the I/O interface 402 may be used to connect with the respective L1 cache and the respective L2 cache, as discussed with reference to FIG. 2D. The I/O interface 402 may be implemented using ports, connectors, pins, or any suitable implementation. In some embodiments, the I/O interface 402 may be used to receive a transaction from a higher level cache to write data associated with the transaction to a lower level cache. The I/O interface 402 may also be used to communicate with the higher level cache on behalf of the lower level cache in response to the transaction.

The transaction decoder 404 may be configured to decode the information associated with the transaction. For example, the transaction decoder 404 may be used to decode the transaction 300 received from the higher level cache 204, e.g., the L1 caches 104a-104n or the L2 caches 106a-106n, to identify the command code 300a in the transaction 300. For example, the command code 300a may indicate the "write evict full", "write back full", or any other command. As discussed with reference to FIG. 3A and FIG. 3B, the transaction decoder 404 may determine whether the data for the transaction has been modified or not modified relative to a copy of the data for the transaction that exists in the memory 110 based on the value of the command code 300a.

The interconnect monitor 406 may be configured to monitor the interconnect 208 between the higher level cache 204 and the lower level cache 206 to determine that there is congestion on the interconnect 208. For example, in one embodiment, the lower level cache 206 may be the LLC 108, the higher level cache 204 may be one of the L2 caches 106a-106n, and the interconnect 208 may be the interconnect 114, as discussed with reference to FIGS. 2B and 2C. In one instance, the interconnect monitor 406 may determine that the interconnect 114 is congested when the request to access the interconnect 114 does not win arbitration in a predetermined amount of time. In some embodiments, the predetermined amount of time may be programmable. In another instance, the interconnect monitor 406 may determine that the interconnect 114 is congested based on receiving retry messages from the LLC 108. For example, the LLC 108 may be receiving too many requests and may be busy. When the LLC 108 sends a retry message via the interconnect 114 it may be visible to all the L2 caches 106a-106n. Thus, in some embodiments, inability of the LLC 108 to respond to the requests may be considered as congestion. In some embodiments, the interconnect monitor 406 may be configured to activate a mechanism to control the traffic when the congestion is detected on the interconnect 114. For example, the interconnect monitor 406 may set a congestion flag in one of the control registers 410 to indicate that there is congestion on the interconnect 114. In some embodiments, the interconnect monitor 406 may set the congestion flag after receiving an indication from the respective processor core or other congestion controllers that there is congestion on the interconnect. For example, the congestion may have been detected by another congestion controller coupled to the interconnect 114. The interconnect monitor 406 may also be configured to deactivate the mechanism when the congestion is reduced on the interconnect 114. For example, if the access rights to the interconnect 114 can be won easily for a while or the LLC 108 does not send any retry messages for a while, it may be an indication that the congestion has reduced. In some implementations, the interconnect monitor 406 may deactivate the mechanism after blocking a certain number of transactions, after a predetermined period of time, or using another criteria.

The traffic controller 408 may be configured to control the traffic on the interconnect 208 between the higher level cache 204 and the lower level cache 206. In one instance, the traffic controller 408 may control the traffic on the interconnect 208 based on the value of the congestion flag in the control register. For example, if the congestion flag is set to "true", it may be an indication that the interconnect 208 is congested. In one embodiment, the lower level cache 206 may be the LLC 108, the higher level cache 204 may be one of the L2 caches 106a-106n, and the interconnect 208 may be the interconnect 114, as discussed with reference to FIGS. 2B and 2C. In some embodiments, the traffic controller 408 may control the traffic by blocking a transaction received from any of the L2 caches 106a-106n for writing the data in the LLC 108 if the data has not been modified. For example, whether the data has been modified or not relative to a copy of the data in the memory 110 may be determined by the transaction decoder 404 as discussed previously.

In some embodiments, the traffic controller 408 may be configured to control the traffic on the interconnect 114 for performance features. For example, each processor core 102a-102n in the processing system 210, 212 or 214 may have been allocated a respective bandwidth. When the processor core approaches its allocated bandwidth limit, it may be desirable to control the traffic on the interconnect to maintain certain performance. In some embodiments, a traffic shaping flag may be set in a respective control register as an indication that a processor core has reached a bandwidth limit allocated to the processor core. The traffic shaping flag may be set using a software or hardware mechanism. In some implementations, when the traffic shaping flag is set in the control register, the traffic controller 408 may control the traffic by blocking certain transactions that include write backs of the clean data to the lower level cache 206. Thus, in various embodiments, traffic to a given L2 cache from a respective L1 cache, or to the LLC from any L2 cache may be controlled by blocking certain clean write back transactions. Additionally, in some instances, the traffic controller 408 may be configured to compare an address of the transaction with a preconfigured address range. The traffic controller 408 may be further configured to block the transaction to control the traffic if the address of the transaction falls within the preconfigured address range. Thus, traffic going to a lower level cache may be controlled by blocking certain transactions.

The control registers 410 may include various registers which can be implemented in hardware or software (e.g., memory 110). The control registers may include a control register which can be programmed to set a congestion flag to indicate that there is congestion on the interconnect between the higher level cache 204 and the lower level cache 206. For example, the congestion flag may be set by the interconnect monitor 406 upon detecting the congestion. The control register can also be programmed to set a traffic shaping flag to activate traffic control for traffic shaping. In some embodiments, the traffic shaping flag may be set by the respective processor core from the processor cores 102a-102n. The control registers 410 may also include registers to program address filters or a range of addresses which can be compared with an address of a transaction to determine if the transaction needs to be blocked. In some implementations, a first control register may be used to store all the flags associated with the first congestion controller 202a, a second control register may be used to store all the flags associated with the second congestion controller 202b, and an $N^{th}$ control register may be used to store all the flags associated with the $N^{th}$ congestion controller 202n. Note that other configurations of the control registers 410 are possible without deviating from the scope of the disclosed technologies. In one implementation, a number of transactions and a predetermined period of time may be programmed in a control register that can be used to deactivate the mechanism to reduce the congestion.

The communication protocol interface 412 may be configured to communicate with the higher level cache 204 to respond for the transaction on behalf of the lower level cache 206 based on a communication protocol associated with the interconnect 208. The communication protocol may be based on a handshake protocol or any other suitable protocol supported by the given processing system. For example, when a transaction is blocked by the traffic controller 408, the communication protocol interface 412 may be used to send an acknowledgement back to the given higher level cache which initiated the transaction. Thus, in some instances, the congestion controller 400 may provide similar functionality as of a bus controller by implementing appropriate handshake protocol to communicate with the higher level cache. In some instances, the congestion controller 400 may pretend to function as the lower level cache or the memory 110 for communicating with the respective higher level cache using the handshake protocol.

FIG. 5 illustrates a method 500 executed by a circuit to control traffic on an interconnect, in some embodiments. The interconnect may be used to connect a lower level cache with a higher level cache.

In step 502, a circuit in a processing system with hierarchical caches may receive a transaction from a higher level cache to write data associated with the transaction to a lower level cache. The higher level cache may be coupled to the circuit and to a processor core. The circuit may be coupled to the lower level cache. For example, the circuit may be the congestion controller 202 coupled to the higher level cache 204 and to the lower level cache 206. In one embodiment, the circuit may be the first congestion controller 202a, the higher level cache may be the first L2 cache 106a, and the lower level cache may be the LLC 108, as discussed with reference to FIG. 2B. In another embodiment, the circuit may be the congestion controller 202, the higher level cache may be the first L2 cache 106a, and the lower level cache may be the LLC 108, as discussed with reference to FIG. 2C. In another embodiment, the circuit may be the first congestion controller 202a, the higher level cache may be the first L1 cache 104a, and the lower level cache may be the first L2 cache 106a, as discussed with reference to FIG. 2D. The I/O interface 402 may receive a transaction from the higher level cache 204 to write data associated with the transaction to the lower level cache 206.

In step 504, the circuit may determine based on an indication in the transaction that the data to be written to the lower level cache 206 is unmodified relative to a copy of the data in a memory coupled to the lower level cache 206. For example, the transaction may be similar to the transaction 300 as shown in FIG. 3A. The transaction decoder 404 may decode the command code 300a of the transaction to determine if a value of the command code 300a indicates a "WEF" or a "WBF" command. A value "WEF" of the command code 300a may be an indication that the data associated with the transaction is clean or has not been modified relative to a copy of the data in the memory 110.

In step 506, the circuit may block the transaction from writing the data to the lower level cache 206 upon determining that the copy of the data exists in the memory. For example, the traffic controller 408 may block the transaction from writing the data to the lower level cache 206 upon determining that the copy of the data exists in the memory 110. In some embodiments, the traffic controller 408 may block the transaction from writing the data to the lower level cache 206 if a mechanism to control the traffic on the interconnect 208 between the higher level cache 204 and the lower level cache 206 has been activated, e.g., if a congestion flag or a traffic shaping flag is set in a control register. In some instances, a congestion flag is set if congestion is detected by the first congestion controller 202a or by other congestion controllers, e.g., the second congestion controller 202b, or the $N^{th}$ congestion controller 202n. In some embodiments, the traffic controller 408 may block the transaction from writing the data to the lower level cache 206 if an address of the transaction falls within a preconfigured address range programmed in a control register.

Figure 6:
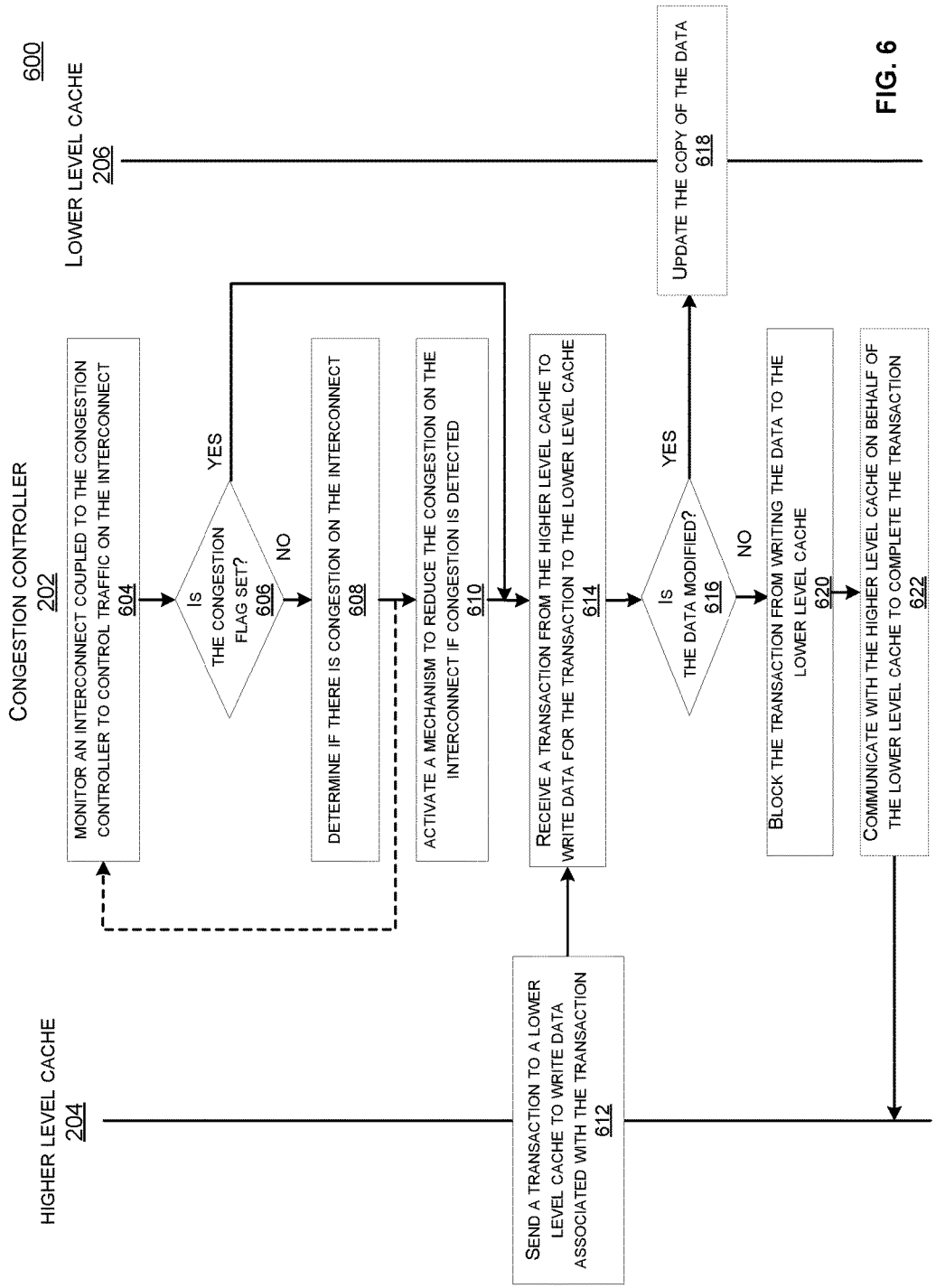
FIG. 6 illustrates a flow diagram to control traffic on the interconnect when there is congestion on the interconnect, according to some embodiments.

FIG. 6 illustrates a flow diagram 600 to control traffic on the interconnect between the higher level cache and the lower level cache using the congestion controller 202 when there is congestion on the interconnect, according to some embodiments. In one embodiment, the congestion controller 202 may be the first congestion controller 202a, the lower level cache 206 may be the LLC 108, and the higher level cache 204 may be the first L2 cache 106a, as discussed with reference to FIG. 2B. In another embodiment, the lower level cache 206 may be the LLC 108, and the higher level cache 204 may be the first L2 cache 106a, as discussed with reference to FIG. 2C. In some implementations, the congestion controller 202, the higher level cache 204, and the lower level cache 206 may be part of the apparatus 200. For example, the apparatus 200 may be part of the processing system 210 or 212.

In step 604, the congestion controller 202 may monitor an interconnect coupled to the congestion controller 202. As discussed with reference to FIG. 2B or 2C, the congestion controller 202 may be coupled to the interconnect 114 and to the first L2 cache 106a. The interconnect 114 may be used for communication between the L2 caches 106a-106n and the LLC 108. The interconnect monitor 406 may be used to monitor the interconnect 114 to control the traffic on the interconnect 114, as discussed with reference to FIG. 4.

In step 606, the congestion controller 202 may determine if the congestion flag is set. For example, in some instances, congestion detected by one congestion controller may be triggered to the software or to all other congestion controllers so that all the congestion controllers can start blocking transactions for writing the clean data to the LLC 108. As an example, the congestion may have been detected by the second congestion controller 202b or the $N^{th}$ congestion controller 202n. In another instance, the congestion flag may have been set by the first congestion controller 202a at an earlier point in time. If the congestion flag is set, the congestion controller 202 may jump to executing the step 614.

In step 608, if the congestion flag is not set, the congestion controller 202 may determine if there is congestion on the interconnect 114. In one instance, the congestion on the interconnect 114 may be caused if a number of requests to access the LLC 108 via the interconnect 114 is more than the LLC 108 can process based on the implementation. In such cases, the LLC 108 may respond with a retry message that can be interpreted by the interconnect monitor 406 as an indication of the congestion on the interconnect 114. In some instances, the congestion can be detected based on the arbitration results. For example, if a request to access the interconnect 114 repeatedly loses arbitration for access rights to the interconnect 114, it can be interpreted by the interconnect monitor 406 as an indication of the congestion on the interconnect 114. If the congestion is not detected on the interconnect 114, the congestion controller 202 may go back to executing the step 604.

In step 610, the congestion controller 202 may activate a mechanism to reduce the congestion on the interconnect 114 if the congestion is detected. For example, if the congestion is detected by the interconnect monitor 406, the interconnect monitor 406 may set a congestion flag in a control register to indicate that there is congestion on the interconnect 114. The control register may be part of the control registers 410. The congestion flag may be used by the traffic controller 408 as an indication to reduce the congestion on the interconnect 114. In some implementations, setting of the congestion flag in the first congestion controller 202a may trigger to the software or to all other congestion controllers an indication that there is congestion on the interconnect 114.

In step 612, the higher level cache 204 may send a transaction to the lower level cache 206 to write data associated with the transaction. In one instance, the data may be associated with a cache line which may be evicted by the higher level cache 204 to make room for a new cache line. For example, the cache line may be less frequently used as compared to the new cache line. The evicted cache line may be in an exclusive state. The higher level cache 204 may initiate a transaction to write clean data for the evicted cache line to the lower level cache 206 for future use since the evicted cache line may only be present in the higher level cache 204.

In step 614, the congestion controller 202 may receive a transaction from the higher level cache 204 to write the data for the transaction to the lower level cache 206. For example, the interconnect monitor 406 may intercept the transaction sent by the higher level cache 204 to the lower level cache 206. The transaction may include clean data for the evicted cache line. However, a copy of the data for the evicted cache line may exist in the memory 110 and thus, writing the data for the evicted cache line may not be necessary for functional correctness.

In step 616, the congestion controller 202 may determine if the data for the transaction has been modified relative to a copy of the data in the memory 110. In some embodiments, the congestion controller 202 may determine, based on an indication in the transaction, that the data to be written to the lower level cache 206 is unmodified relative to a copy of the data for the transaction that exists in the memory 110. For example, the congestion controller 202 may determine, based on the value of the command code received in the transaction, whether the data has been modified or not. As an example, the transaction may be similar to the transaction 300 as discussed with reference to FIG. 3A. A value "WEF" for the command code 300a may indicate that the data has not been modified and a value "WBF" for the command code 300a may indicate that the data has been modified.

In step 618, if the data has been modified relative to a copy of the data in the memory 110, the congestion controller 202 may send the data to be written into the lower level cache 206 or to the memory 110 to have consistent data. The data may be updated based on the cache coherence protocol implemented by the processing system 210.

In step 620, if the data has not been modified or the data is clean, the congestion controller 202 may block the transaction for writing the data to the lower level cache 206 to reduce congestion on the interconnect 114. For example, blocking the transaction for writing the data to the lower level cache 206 may be interpreted as eliminating the transaction, or blocking the transaction to be deployed to the lower level cache 206 on the interconnect 114. Since the data for the transaction is clean and a copy of the data exists in the memory 110, blocking the transaction may reduce further congestion on the interconnect 114 without affecting the functional correctness.

In step 622, the congestion controller 202 may optionally communicate with the higher level cache 204 on behalf of the lower level cache 206 in response to the transaction. For example, based on the communication protocol implemented by the interconnect 114, in some implementations, the higher level cache 204 may expect a response from the lower level cache 206 for the transaction to write back the data into the lower level cache 206 initiated by the higher level cache 204. The communication protocol interface 412 may be used to communicate with the higher level cache 204 on behalf of the lower level cache 206 in response to the transaction from the higher level cache 204. For example, in some embodiments, the communication protocol interface 412 may send an acknowledgement according to a handshake protocol to the higher level cache 204 to proxy for the lower level cache 206.

Figure 7:
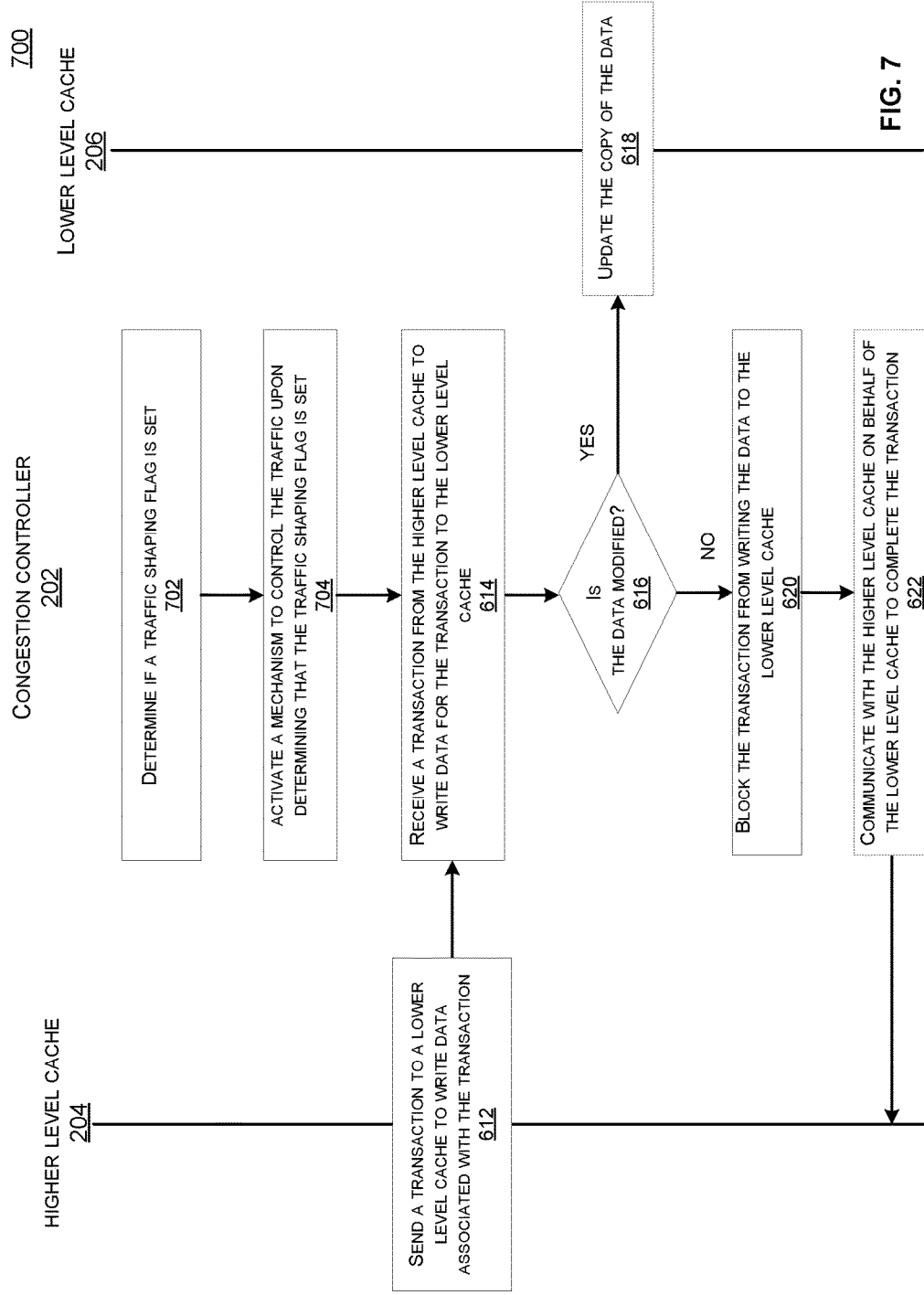
FIG. 7 illustrates a flow diagram to control traffic on the interconnect for traffic shaping using the congestion controller, according to some embodiments.

FIG. 7 illustrates a flow diagram 700 to control traffic on the interconnect for traffic shaping using the congestion controller 202, according to some embodiments. In one embodiment, the congestion controller 202 may be the first congestion controller 202a, the lower level cache 206 may be the LLC 108, and the higher level cache 204 may be the first L2 cache 106a, as discussed with reference to FIG. 2B. In another embodiment, the higher level cache may be the first L2 cache 106a, and the lower level cache may be the LLC 108, as discussed with reference to FIG. 2C. In another embodiment, the congestion controller 202 may be the first congestion controller 202a, the higher level cache may be the first L1 cache 104a, and the lower level cache may be the first L2 cache 106a, as discussed with reference to FIG. 2D. In some implementations, the congestion controller 202, the higher level cache 204 and the lower level cache 206 may be part of the apparatus 200. For example, the apparatus 200 may be part of the processing system 210, 212, or 214.

In step 702, the congestion controller 202 may determine if a traffic shaping flag is set. For example, the traffic shaping flag may be set in a control register as an indication that a processor core has reached a bandwidth limit allocated to the processor core. The traffic shaping flag may be set using a software or hardware based mechanism. For example, each processor core 102a-102n may have been allocated a respective bandwidth. In some embodiments, when the processor core approaches its allocated bandwidth limit, it may be desirable to control the traffic on the interconnect coupled to the lower level cache 206. In some embodiments, the processor core may be configured to behave in such manner based on an SLA.

In step 704, the congestion controller 202 may activate a mechanism to control the traffic upon determining that the traffic shaping flag is set. For example, activating the mechanism may trigger blocking the transactions that include writing back clean data to the lower level cache 206. Referring back to FIG. 4, the traffic controller 408 may control the traffic by blocking the transactions which include writing data to the lower level cache 206 if the data has not been modified relative to the copy of the data in the memory 110, as described using the steps 612-622.

Steps 612, 614, 616, 618, 620, and 622 are similar to the steps described with reference to the method 600 in FIG. 6.

Figure 8:
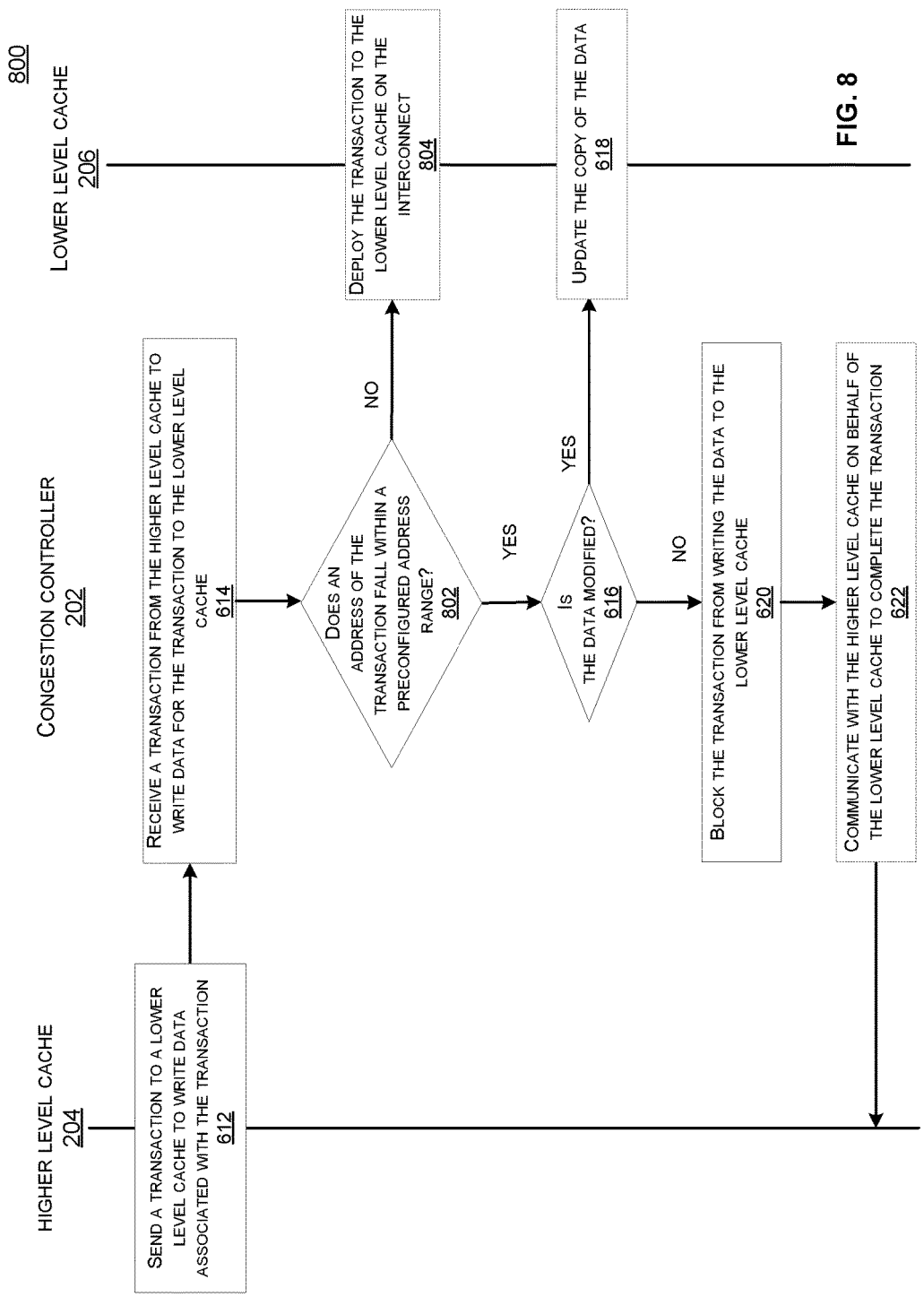
FIG. 8 illustrates a flow diagram to control traffic on the interconnect using the congestion controller by blocking transactions with certain addresses, according to some embodiments.

FIG. 8 illustrates a flow diagram 800 to control traffic on the interconnect using the congestion controller 202 by blocking transactions with certain addresses, according to some embodiments. In one embodiment, the congestion controller 202 may be the first congestion controller 202a, the lower level cache 206 may be the LLC 108, and the higher level cache 204 may be the first L2 cache 106a, as discussed with reference to FIG. 2B. In another embodiment, the higher level cache may be the first L2 cache 106a, and the lower level cache may be the LLC 108, as discussed with reference to FIG. 2C. In another embodiment, the congestion controller 202 may be the first congestion controller 202a, the higher level cache may be the first L1 cache 104a, and the lower level cache may be the first L2 cache 106a, as discussed with reference to FIG. 2D. In some implementations, the congestion controller 202, the higher level cache 204, and the lower level cache 206 may be part of the apparatus 200. For example, the apparatus 200 may be part of the processing system 210, 212, or 214.

Steps 612 and 614 are same as the steps 612 and 614 as discussed with reference to FIG. 6.

In step 802, the congestion controller 202 may determine if an address of the transaction falls within a preconfigured address range. If the address falls within the preconfigured address range, the transaction may be blocked and the method 700 may execute the steps 616, 618, 620, and 622, as discussed with reference to method 600 in FIG. 6. If the address does not fall within the preconfigured address range, the transaction may be allowed to be sent to the lower level cache 206.

In step 804, the congestion controller 202 may allow the transaction to be deployed to the lower level cache 206 on the interconnect coupled to the lower level cache 206 and the higher level cache 204 if the address does not fall within the preconfigured address range. The lower level cache 206 may process the transaction as per the implementation.

Steps 616, 618, 620 and 622 are similar to the steps 616, 618, 620 and 622 as described with reference to the method 600 in FIG. 6.

As discussed with reference to FIGS. 2A-2D, 3-8, embodiments of the disclosed technologies can provide a mechanism to dynamically control the traffic on an interconnect used to couple a higher level cache to a lower level cache in a processing system. The mechanism can be internal to the caches or the processor cores, or externally connected to the interconnect. In some embodiments, an external circuit coupled to the interconnect can provide a minimally invasive method to improve the performance of the system during bursty periods of congestion without affecting the functional performance of the system. In addition, some embodiments can be used to control the traffic on the interconnect for traffic shaping or other performance features.

Figure 9:
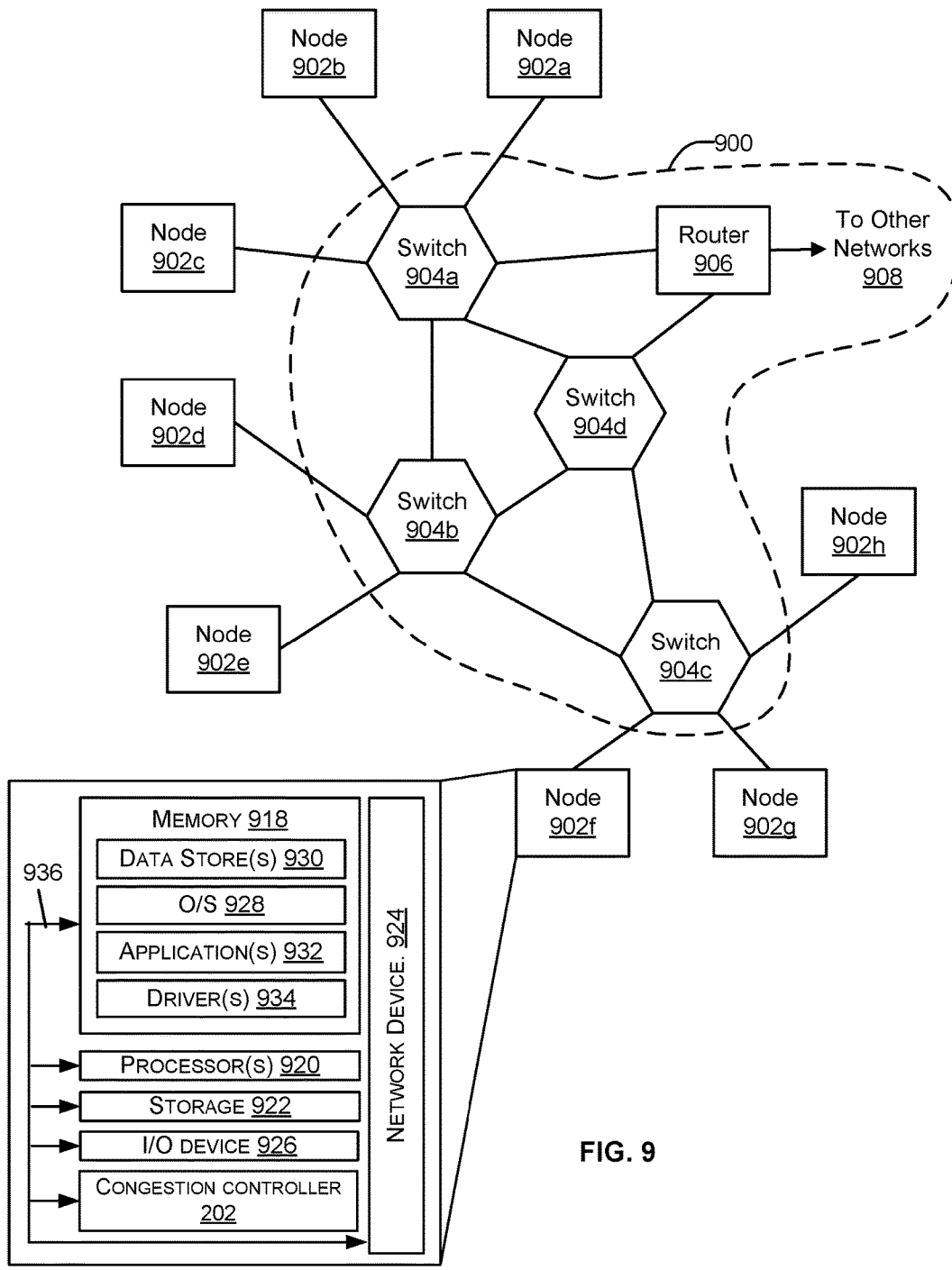
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of computing devices, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processing systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). In some embodiments, the processors 920 may be similar to the process cores 102a-102n, and the memory 918 may be similar to the memory 110. In some embodiments, one or more node(s) 902a-902h may include the congestion controller 202, as discussed with reference to FIG. 2A, to control traffic on an interconnect between a higher level cache with a lower level cache. The processor(s) 920 may be implemented in hardware, computer-executable instructions, firmware, or combinations thereof.

Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
   a higher level cache communicatively coupled to a processor core;
   a lower level cache communicatively coupled to a memory; and
   a congestion controller communicatively coupled to the higher level cache and to the lower level cache, wherein the congestion controller comprises:
      an interconnect monitor configured to monitor an interconnect between the higher level cache and the lower level cache to determine if there is congestion on the interconnect, and to activate a mechanism to control traffic on the interconnect in response to detecting that there is congestion on the interconnect;
      an input/output (I/O) interface configured to receive a transaction from the higher level cache to write data associated with the transaction to the lower level cache;
      a transaction decoder configured to determine that the data to be written to the lower level cache is unmodified relative to a copy of the data for the transaction that exists in the memory based on an indication in the transaction;
      a traffic controller configured to block the transaction from writing the data to the lower level cache in response to determining that the data is unmodified, wherein the transaction is blocked based on activation of the mechanism to control traffic on the interconnect by the interconnect monitor; and
      a communication protocol interface configured to communicate with the lower level cache to respond on behalf of the lower level cache based on a communication protocol for the interconnect.

2. The apparatus of claim 1, wherein the interconnect includes a multiplexer, a mesh, a matrix, or a bus.

3. The apparatus of claim 1, wherein the congestion controller is a first congestion controller, and the interconnect is also coupled to a second congestion controller.

4. The apparatus of claim 3, wherein the higher level cache is a first higher level cache, and the second congestion controller is coupled to a second higher level cache.

5. An apparatus comprising:
   a cache hierarchy comprising a higher level cache and a lower level cache, wherein a processor core is coupled to the higher level cache; and
   a circuit coupled to the higher level cache and the lower level cache, wherein the circuit is configured to:

detect congestion on an interconnect between the higher level cache and the lower level cache;

receive a transaction from the higher level cache to write data associated with the transaction to the lower level cache;

determine based on an indication in the transaction that the data to be written to the lower level cache is unmodified relative to a copy of the data for the transaction that exists in a memory communicatively coupled to the lower level cache; and block the transaction from writing the data to the lower level cache in response to the determination that the data to be written to the lower level cache is unmodified and based on the detection of congestion on the interconnect.

6. The apparatus of claim 5, wherein the circuit is further configured to:

communicate with the higher level cache to respond on behalf of the lower level cache based on a communication protocol.

7. The apparatus of claim 5, wherein the circuit is further configured to:

prior to receiving the transaction from the higher level cache, monitor the interconnect between the higher level cache and the lower level cache, wherein the detection of congestion on the interconnect comprises determining, based on a result of the monitoring, that there is congestion on the interconnect; and activate a mechanism to reduce the congestion on the interconnect in response to the determining that there is congestion on the interconnect, wherein the blocking of the transaction is further in response to determining, by the circuit, that the mechanism to reduce the congestion on the interconnect has been activated.

8. The apparatus of claim 7, further comprising an arbiter configured to arbitrate requests to access the interconnect, wherein the circuit determines that there is congestion on the interconnect if a request to access the interconnect by the circuit loses arbitration.

9. The apparatus of claim 7, wherein the circuit determines that there is congestion on the interconnect responsive to receiving a retry message from the lower level cache.

10. The apparatus of claim 5, wherein the circuit is further configured to:

receive a second transaction from the higher level cache to write data to the lower level cache;

determine based on an indication in the second transaction that the data for the second transaction is unmodified relative to a copy of the data for the second transaction that exists in the memory;

determine that an address associated with the second transaction falls within a preconfigured address range; and block the second transaction from writing to the lower level cache in response to the determination that the data for the second transaction is unmodified and further in response to the determination that the address associated with the second transaction falls within the preconfigured address range.

11. The apparatus of claim 5, wherein the circuit is further configured to:

receive a second transaction from the higher level cache to write data to the lower level cache;

determine based on an indication in the second transaction that the data for the second transaction is unmodified relative to a copy of the data for the second transaction that exists in the memory;

prior to receiving the second transaction from the higher level cache, determine if a traffic shaping flag is set;

as a result of determining that the traffic shaping flag is set, activate a mechanism to control the traffic on the interconnect between the higher level cache and the lower level cache; and block the second transaction from writing to the lower level cache in response to the determination that the data for the second transaction is unmodified and based on the activation of the mechanism to control the traffic on the interconnect.

12. The apparatus of claim 11, wherein the traffic shaping flag is set if the processor core exceeds a bandwidth limit allocated to the processor core.

13. The apparatus of claim 5, wherein the transaction includes a command code and the indication in the transaction corresponds to a value of the command code.

14. The apparatus of claim 5, wherein the higher level cache is a level 1 (L1) cache and the lower level cache is a level 2 (L2) cache.

15. The apparatus of claim 5, wherein the higher level cache is a level 2 (L2) cache and the lower level cache is a level 3 (L3) cache.

16. The apparatus of claim 5, wherein the circuit is integrated with the higher level cache or the lower level cache.

17. A method, comprising:

monitoring, by a congestion controller, an interconnect between a higher level cache and a lower level cache, the higher level cache being coupled to a processor core and to the congestion controller, the congestion controller being coupled to the lower level cache;

determining, based on the monitoring by the congestion controller, that there is congestion on the interconnect;

activating a mechanism to reduce the congestion on the interconnect in response to the determining that there is congestion on the interconnect;

receiving a transaction from the higher level cache to write data associated with the transaction to the lower level cache;

determining, based on an indication in the transaction, that the data to be written to the lower level cache is unmodified relative to a copy of the data for the transaction that exists in a memory communicatively coupled to the lower level cache; and blocking the transaction from writing the data to the lower level cache in response to the determining that the data to be written to the lower level cache is unmodified and based on the activating of the mechanism to reduce the congestion on the interconnect.

18. The method of claim 17, further comprising:

communicating with the higher level cache to respond on behalf of the lower level cache based on a communication protocol.

19. The method of claim 17, wherein blocking the transaction from writing the data to the lower level cache includes blocking the transaction from deploying to the lower level cache on the interconnect.

* * * * *